July 5, 1938.  B. KAHN  2,122,745
MASTERLESS CONNECTING ROD MECHANISM FOR RADIAL ENGINES OR PUMPS
Filed March 2, 1936  5 Sheets-Sheet 1

INVENTOR
Benjamin Kahn

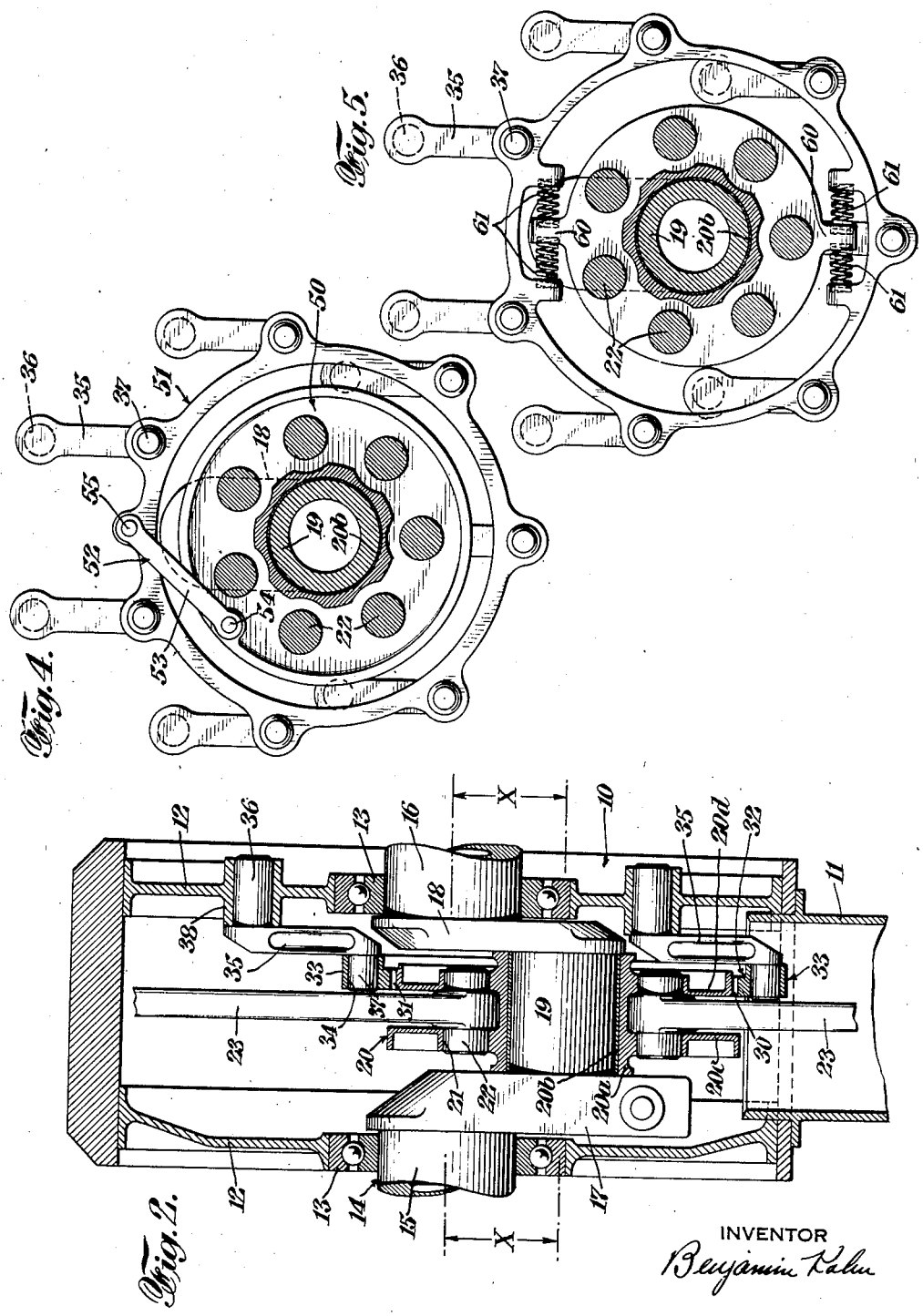

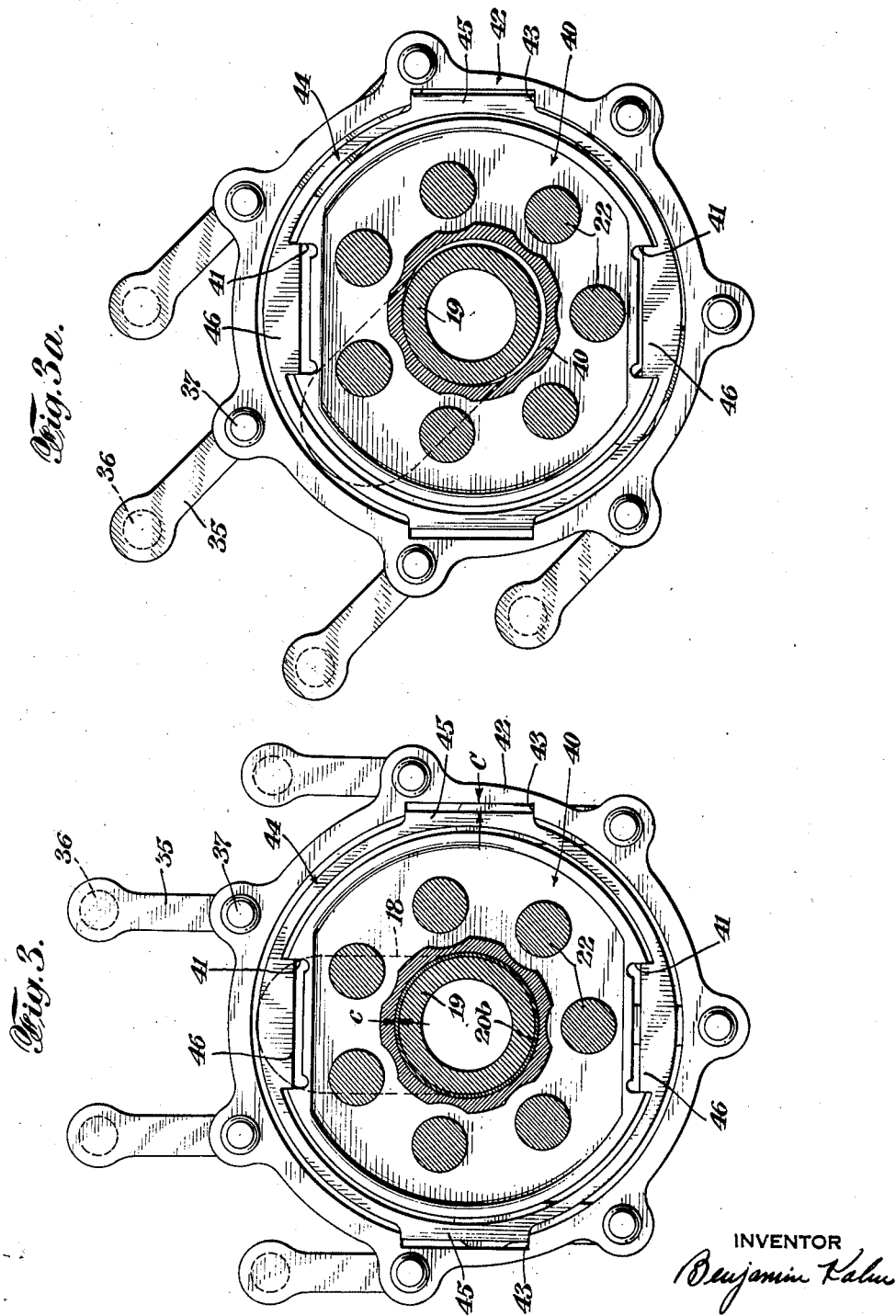

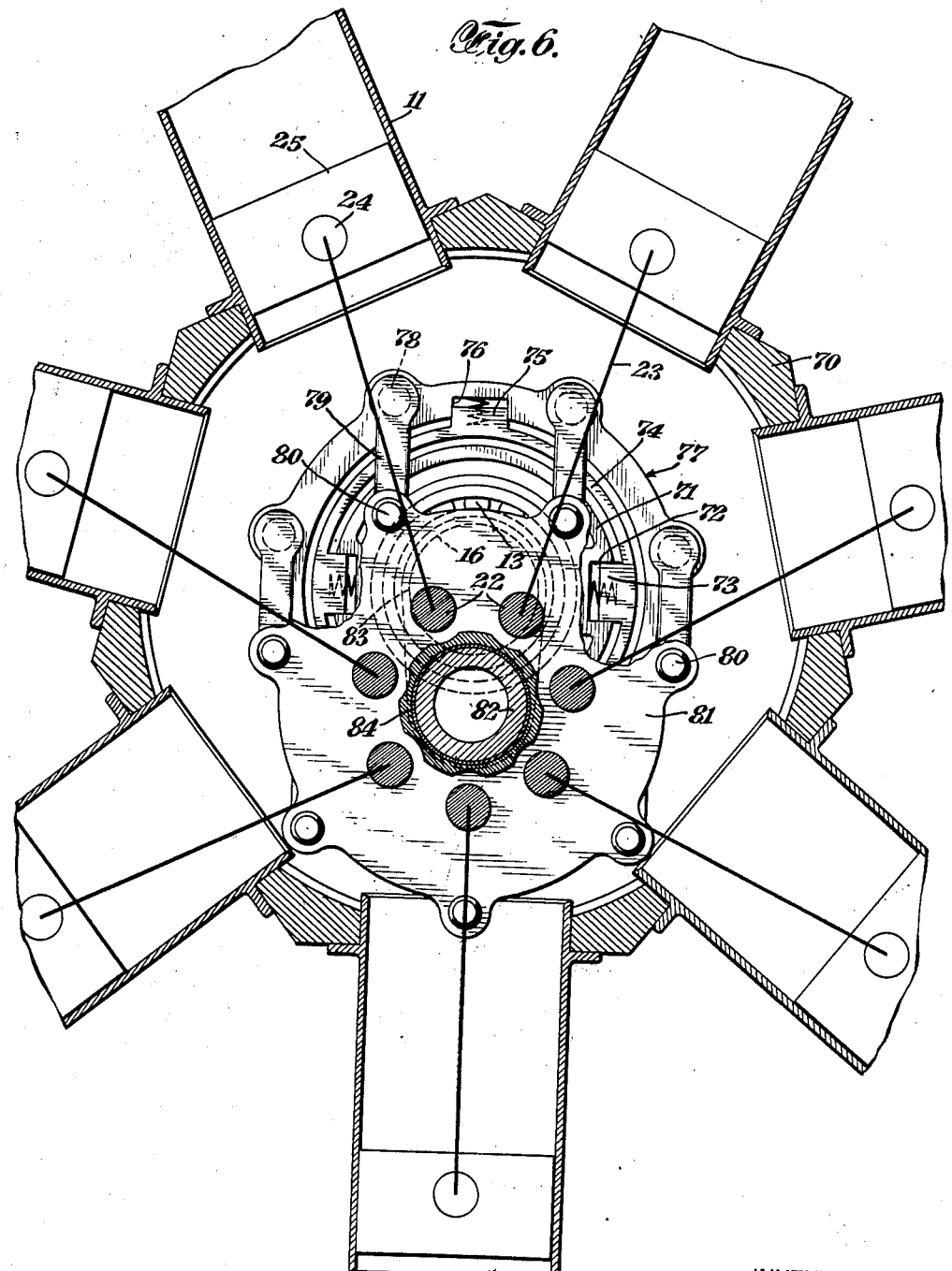

July 5, 1938.  B. KAHN  2,122,745
MASTERLESS CONNECTING ROD MECHANISM FOR RADIAL ENGINES OR PUMPS
Filed March 2, 1936   5 Sheets-Sheet 5
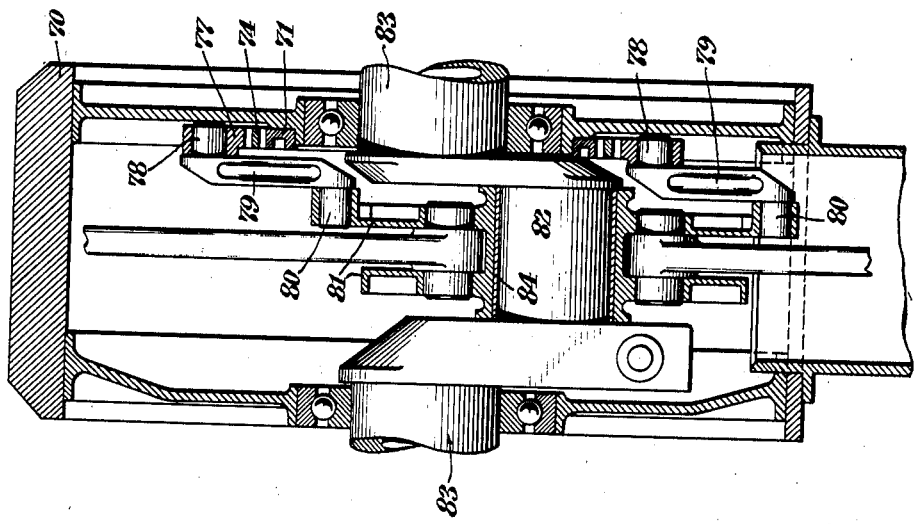
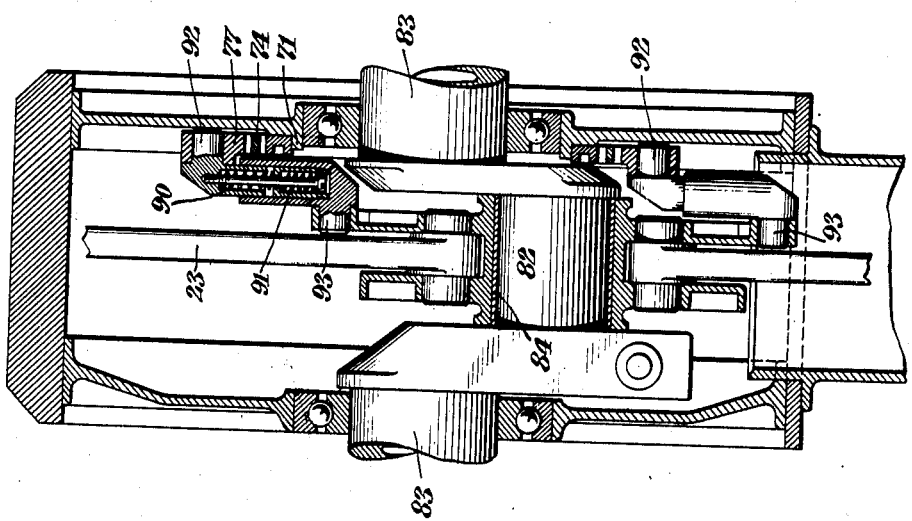
INVENTOR
Benjamin Kahn Patented July 5, 1938

2,122,745

UNITED STATES PATENT OFFICE 2,122,745

MASTERLESS CONNECTING ROD MECHANISM FOR RADIAL ENGINES OR PUMPS

Benjamin Kahn, New York, N. Y., assignor to Kinetic Cycle Research Corporation, New York, N. Y., a corporation of New York Application March 2, 1936, Serial No. 66,559

16 Claims. (Cl. 121—120)

This invention relates to improvements in mechanism for converting reciprocating motion into rotary motion or vice versa as of the type employed in "masterless" connecting-rod mechanism for radial engines or pumps. This invention also relates to the same subject matter as my co-filed application, Serial Number 66,558. More particularly the invention is concerned with, and is an improvement over, the type that employs a knuckle pin receiving yoke on the crankpin of a crankshaft having pivotal or articulated connections with all of the connecting rods. This yoke member is so arranged that every point thereon is adapted to move in an annular orbit of substantially the same magnitude as that of the crankpin axis by means of pivotal connections with a plurality of cantilever type auxiliary cranks of the same throw as the crankpin; the cranks being pivoted in the crankcase, and being parallelly arranged to the disposition of the crankpin and interconnected by the said yoke member. This yoke member is subject to torque around the crankpin center by the system of forces acting thereon via the connecting rods which are not directed to the center of the crankpin. These forces create a torque on the yoke member around the crankpin center. The crankcase resists the torque of the yoke member via the auxiliary cranks which are journalled in the crankcase and pivotally connected to the yoke member.

The object of this invention includes the provision of a cheap, simple, and dependable mechanism for the purpose set forth whereby the effective operation of such a device is had with parts made not subject to close tolerance limits. The invention contemplates the provision of mechanism of the "masterless" connecting rod type for the conversion of motion in radial engines or pumps having included, means for compensating for the inherent disturbing characteristics including bearing failure, heat expansions, and load deflections of the component parts of the structure.

Another object of the invention is the production of a device of the said character employing light auxiliary cranks which are not subject to abnormal loads.

Another object of the invention is the provision of yieldable means in the train of parts whereby the forces created by the torque of the knuckle pin receiver that are transmitted to the crankcase are yieldingly transmitted through the auxiliary cranks.

The invention further contemplates provision against severe damage to the parts of an engine or pump in the event of crankshaft bearing or crankpin bearing failure.

Another object is to provide a device of the character described with compensating means in the torque transmitting train whereby the weight of the rotating masses on the crankpin are minimized and whereby all the rotating parts are substantially dynamically balanced in their effect on the crankshaft.

Another object is to provide a device of this character with a substantially static compensating means in the torque transmitting train thereby minimizing the weight of the rotating masses.

To this end the invention proposes the employment of a compensating means in the torque transmitting train between a knuckle pin receiver and the crankcase, said compensating means being pivotally joined to all the auxiliary cranks and being of the torque transmitting and self-aligning type.

Various and other specific objects and advantages are contemplated, as will clearly appear from the detailed description following, read in connection with the accompanying drawings which form a part of this disclosure, and which illustrate by way of example various preferred embodiments of the invention. The invention consists in such novel features, arrangements, combination of parts as are shown and described.

In the drawings:

Figure 2 is a longitudinal section substantially on the line 2—2 of Figure 1.

Figure 3 is a fragmentary view showing a modification of certain elements shown in Figure 1.

Figure 3a is a view of the parts of Figure 3 in an abnormal working condition.

Figure 4 is a view similar to Figure 3 showing another modification of the invention.

Figure 5 is another modified form of the type illustrated in Figures 2, 3 and 4.

Figure 6 is a modified form of Figure 3 with the compensating means statically employed.

Figure 7 is a longitudinal section of Figure 6.

Figure 8 is a further modification of the structure shown in Figure 6.

Figure 1:
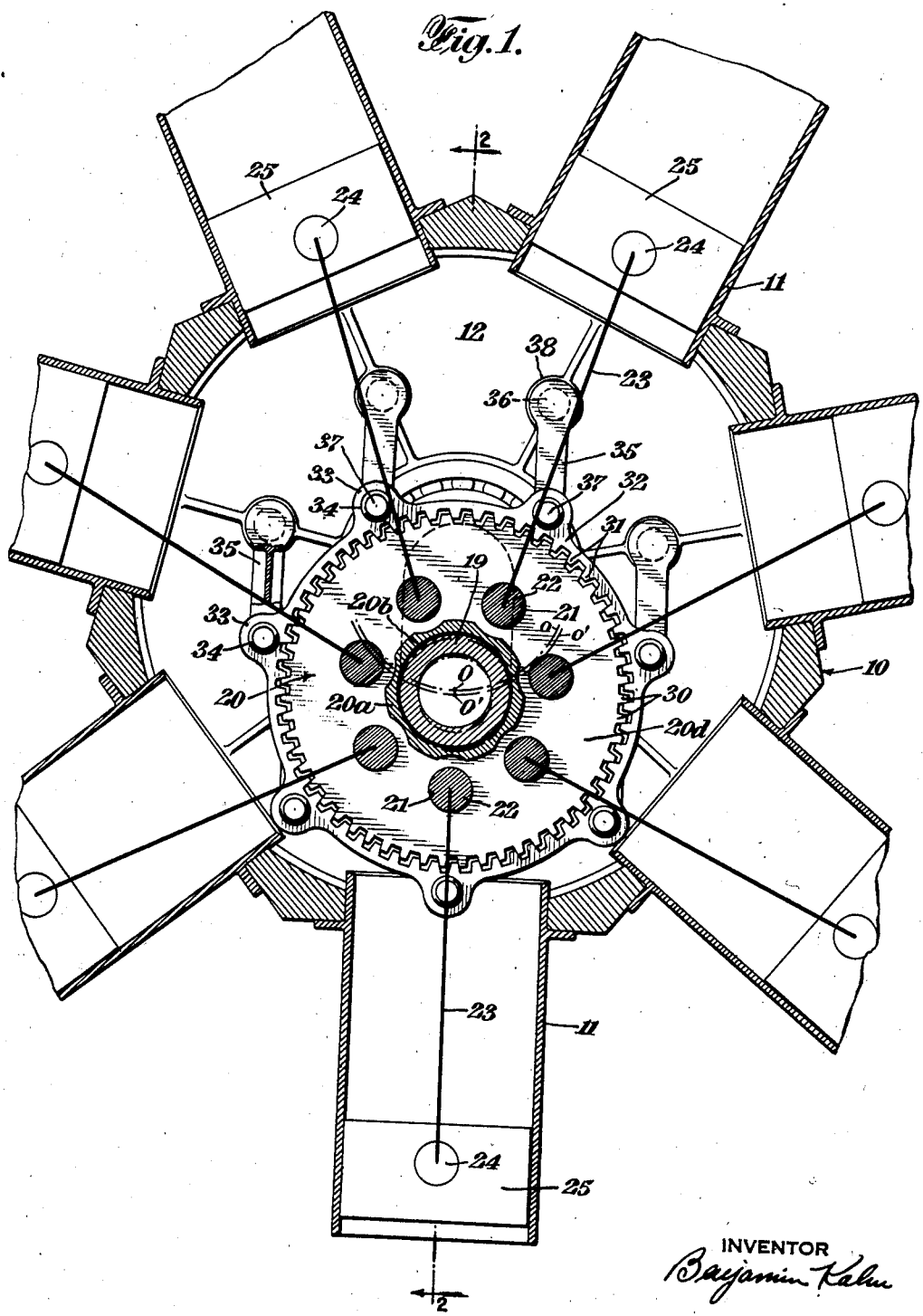
Figure 1 is a transverse section of the central portion of an engine or pump embodying certain features of the invention, with the connecting rods shown diagrammatically.

In such mechanism, beside other important considerations, it is desirable that the cooperating parts as well as the locations of the journals of the cooperating parts be made very accurately and within very close limits and low manufacturing tolerances in order that they function properly; otherwise, the parts will bind and replacements of individual parts will be difficult. The throw of the auxiliary cranks must all be quite equal to each other and equal to the throw of the crankpin within the low allowable tolerances. Similarly, the journals for these auxiliary cranks must all be at quite equal radii from the center of the crankshaft. The diameters of the bearing portion of the journalled and pivoted cooperating parts must also be made extremely accurate in order to accomplish smooth rotation of the main crank, the yoke-like member, and the auxiliary cranks, without undue strain on these parts. Even with the necessary manufacturing tolerances within very close limits provided for in these parts, the smooth operation of such a device is not achievable in that this accuracy of the parts and the accuracy of cooperation of the parts cannot be maintained under operating conditions.

Even if the parts are ideally made, other factors which nullify such accuracy of the parts are heat expansion and load distortion as encountered under running conditions in pumps and especially in internal combustion engines. Therefore, no matter how accurate the parts are made, even under most exacting precision conditions, proper functioning of such structures as described, during running conditions, is unachievable.

A further disturbing factor in internal combustion engines especially, is deflections of parts under loads due to the high cylinder pressures as well as high inertia loads acting on the main crankpin. These loads not only displace the axes of the parts but also throw them out of parallel which induces high local bearing loads and high local frictional conditions which are decidedly disadvantageous.

The most serious consideration of such structures is the harmful effect upon an engine working under abnormal conditions such as resulting from excessive bearing wear or bearing failure. This is so because in the event of the excessive crankshaft or crankpin bearing wear or complete failure thereof, the annular path of travel, or orbit, of the yoke tends to change materially, while the orbits of the crankpins of the auxiliary cranks are unvaried, thereby transferring part or all of the radial loads from the main crankpin to the auxiliary cranks. This causes overstraining of the auxiliary cranks which are preferably of light construction to keep the size and weight of the engine to a minimum, and are therefore relatively weak. These auxiliary cranks, preferably of cantilever construction, in cooperation with a yoke member, would each be almost as large and heavy as a main crank to withstand such forces after a bearing has failed.

In the prior art auxiliary cranks have been proposed which comprised rigid auxiliary cranks having pins thereon at fixed distances from each other, one of said pins being journalled in the crankcase and the other journalled in the knuckle pin receiver.

Floating bushings have been proposed in the prior art, which are disposed between the knuckle pin receiver and the auxiliary cranks, but these have been found inadequate for purpose of sufficiently compensating for load deflections and other distortions mentioned and are not capable of sustaining the parts during the loss of a bearing liner of wall thickness as low as .030". To accommodate for the loss of such a liner, at least eleven bushings would be required. Assuming a space between such bushings of .005", this provides .060" for take-up of the spaces between bushings; distributed as follows; .030" for the liner, at least .015" for accumulative manufacturing tolerance, and at least .015" for load deflections of the main crankpin. When it is desirable to employ at least three auxiliary cranks, the number of bushings necessary would be at least 33.

Furthermore, as found desirable in high output internal combustion engines to employ one auxiliary crank per cylinder, on a nine cylinder engine, 99 bushings would have to be employed.

Beside the larger number of bushings necessary, a further disadvantage of such construction is the resulting increase in outside diameter of the engine. This is due to the large diameter of the outermost bushings which increases the inside diameter of the crankcase due to the larger clearance path required by the auxiliary cranks.

These examples take into account only the failure of the crankpin liner. The conditions are further aggravated and twice the number of bushings would be required if provision is desired against simultaneous failure of both the crankpin bearing liner and a similar crankshaft bearing liner.

In carrying out the objectives of this invention and referring to Figure 1, there is illustrated by way of example, a radial engine crankcase 10 provided with a plurality of cylinders 11 (shown diagrammatically). These cylinders are secured to the crankcase in any desired well known manner. Referring to Figures 1 and 2, the crankcase is provided with transverse end walls 12 adapted to provide, centrally thereof, bearings 13 for a crankshaft 14. The crankshaft 14 comprising power output shaft portions 15 and 16 journalled in the bearings 13; crankcheeks 17 and 18 are secured to the inner ends of the power output shaft portions 15 and 16, and a crankpin 19 is secured between the crankcheeks. The crankpin is disposed with its axis at a distance X from the axes of the power output shaft; this distance representing the crankthrow being one-half the stroke of the engine.

Journalled on the crankpin is a knuckle pin receiver member 20, having a plurality of knuckle pin holes or bearings 21, each pivotally supporting a knuckle pin 22; one knuckle pin for each cylinder. The inner ends of articulated connecting rods 23 are journalled to the knuckle pins, and the outer ends of the rods are connected by wrist pins 24, to pistons 25 in the cylinders.

It will be noted that all the connecting rods are of the same articulated type having their inner ends pivotally connected to a knuckle pin receiving member on the crankpin and not to the crankpin as distinguished from connecting rod systems employing a master rod having its inner end pivotally connected and directly associated with the crankpin.

The knuckle pin receiver 20 is preferably of spool shape having a cylindrical portion 20a adapted to receive a suitable replaceable cylindrical bearing or bearing liner 20b adapted to bear against the crankpin 19. The character of this liner is such as to enable it to receive almost the entire wear, thereby minimizing the wear on both the knuckle pin receiver and crankpin. In an engine or pump without such a liner it would be more difficult and expensive to replace a worn out major part. This liner, as illustrated in Figure 1 is approximately 1/16 inch and in some practical applications has a wall thickness up to about 1/8 inch to provide ample body which is necessary, especially when it is of the floating type and subject to shock loads. Such liners have become essential parts of connecting rod structures, since they are cheapest and easiest to replace when worn down, particularly in radial engine structures or in radial pump structures where a single crankpin is subject to multiple loads of a large number of cylinders.

The knuckle pin receiver is also provided with flanges 20c and 20d integral with and transverse to the cylindrical portion 20a. These flanges are provided with thickened portions adjacent the cylindrical portions to provide bearings 21 for the knuckle pins, said bearings having large areas in these thickened portions.

One of the flanges, as for instance the flange 20d, is provided at its outer periphery with splines 30. These splines are adapted to be loosely engaged by splines 31 internally arranged in an auxiliary crank frame member 32 of substantially ring shape. This frame member has a plurality of bosses 33, each providing a bearing 34 for the pivotal engagement of auxiliary cranks 35. These auxiliary cranks are of the cantilever type having pins 36 journalled in bearings 38 in one of the crankcase walls 12 and other pins 37 engaged in the bearings 34 of the splined frame 32. It is to be particularly noted that the auxiliary crank frame member is directly associated with the auxiliary cranks, and the knuckle pin receiving member is directly associated with the crankpin of the main crankshaft, and that the connection between these members is self-aligning due to the substantially loose but torque transmitting connection of the splines.

The length of the cranks between their pin centers is equal to the throw X of the main crankshaft 14 and prescribes the path of the frame member. As previously mentioned it is desirable that the location of the bearings 38 in the crankcase and the bearings 34 in the splined frame, are so arranged that the cranks in operation are all substantially parallel to each other and substantially parallel to the radial disposition of the crankpin. With such an arrangement the center of the knuckle pin receiver travels in substantially the same orbit or circular path as the circular path of the center of the crankpin. The circular path of the center of the auxiliary crank frame member is confined by the auxiliary cranks to travel in the same circular path of the crankpin center.

The frame 32 is preferably made sufficiently thin to permit of slight flexibility in order to facilitate assembly in the event the auxiliary cranks are of varying lengths, or in the event the locations of bearings for the pins both in the frame and in the crankcase wall vary, or are axially misaligned; or due to manufacturing inaccuracies, load distortions and heat expansions.

The external splines 30 are provided with clearance all around in the internal spline 31, and in operating relationship the external splines of the knuckle pin receiver contact the internal splines of the frame on one face, thereby preventing rotation of the knuckle pin receiver around the crankpin center and confining it to the path of the frame.

When the bearing liner wears down the entire knuckle pin receiver shifts substantially radially outwardly as indicated in Figure 1. Its center O is displaced to O' and the circular path of travel o' is materially increased with respect to the circular path of travel o of the crankpin center and the frame center. This is made possible by the clearance in the splines mentioned.

It will be seen that if no such clearance provision is made as in the case of a yoke member connected to both the main crankpin and auxiliary cranks, the centrifugal tendency of such a yoke member working with a worn or lost bearing liner would be an increased travel path of the yoke member which, working in conjunction with auxiliary cranks having unvariable travel orbits, results in the reception by the auxiliary cranks of the high centrifugal loads as well as part of power and inertia loads. These cranks being necessarily light and of the cantilever type are not suitable for such high load reception.

The clearance of the splines allows for the manufacturing inaccuracies of the vital dimensions governing the engagement of the frame and receiver and therefore initial assembly is facilitated. A broader working range of manufacturing tolerance is thus made possible in the manufacture of these parts. The clearance further provides for the smooth operation under normal working conditions with the axes of parts theoretically coincident, but actually not quite coincident. The clearances also provide for the proper functioning of the parts during abnormal working conditions as in the event of excessive wear or loss of the liner.

It will be seen in Figure 1 that in the event of failure of the liner the parts are capable of self adjustment to accommodate this new condition. The knuckle pin receiver may move radially outwardly from the crankpin center an amount equal to the thickness of the liner and is thus caused to travel in an orbit larger than the orbit of the crankpin center without affecting the orbital movement of the frame which is prescribed by the auxiliary cranks to the same magnitude as the orbit of the crankpin center.

Referring to Figure 3, a knuckle pin receiving member 40 is provided substantially similar to the knuckle pin receiving member 20 of Figure 1. This receiver member 40 is provided on its periphery with two slots 41 parallel to each other and disposed substantially opposite to each other. A frame member 42 is also provided; substantially similar to the frame member 32 of Figure 1. The frame member 42 is provided with two slots 43 parallel to each other and disposed substantially opposite to each other and substantially at right angles to the slots 41 in the knuckle pin receiver 40. An intermediate member 44, disposed between the members 40 and 42, is provided with projections 45 engaging the slots 43 in the member 42, and is also provided with projections 46 engaging the slots 41 in the member 40. The projections and slots of the respective members are close fitting in the driving or torque transmitting direction and radial clearances C are provided between the projections and the slots. Radial clearance is also provided between the members.

The amount of clearance is preferably greater than the thickness of the crankpin bearing liner c employed with these parts.

With such arrangement, and in the event the liner is worn or in the event of the loss of the liner, the knuckle pin member 40 is enabled to travel an increased circular path without subjecting the auxiliary links to high loads. When this takes place, as illustrated in Figure 3a, sliding of the projections in the slots occurs, but at the same time the preferably close fit of the projections in their respective slots maintain a connection between the receiver and the crankcase whereby forces created by the torque of the receiver are transmitted to the crankcase.

In Figure 1 the connection between crankpin bearing liner and the auxiliary cranks comprises two parts, namely the knuckle pin receiver member 20 and the auxiliary crank frame member 32. In Figure 3 three parts are employed between the same points, namely; the knuckle pin receiver member 40, intermediate frame member 44, and an auxiliary crank frame member 42.

The form shown in Figure 4 is similar to the form shown in Figure 3, excepting the slots and projections. In this form, between a knuckle pin receiver 50 and a frame 51, is a torque transmitting connection 52, comprising a link 53 pivoted as at 54 and 55 to the knuckle pin receiver and the frame respectively. Clearance all around is provided between knuckle pin receiver and the auxiliary crank frame.

Figure 5 is substantially similar to the form shown in Figure 1, with the exception, that instead of a spline transmitting connection between the knuckle pin receiver member and the auxiliary crank frame, the knuckle pin receiver is provided with one or more arms 60 spaced from direct contact with the frame. Yielding torque transmitting means is provided between the arms of the knuckle pin receiver and the frame, which in the instant case includes springs 61 between the arms and the frame. This construction not only provides for an increased travel path of the knuckle pin receiver without straining the auxiliary cranks, but also provides resilient torque transmission between these parts.

With ample clearances provided between the knuckle pin receiver and the auxiliary crank frame, heat expansion, load deflections, and misalignment of the parts which tend to increase or change the nature of the travel path of the knuckle pin receiver are possible without damage to the parts. Due to the split or multiple piece connection between the knuckle pin receiver and the crankcase, all misalignment of the axes of the parts is accommodated and high loads borne by the crankshaft and crankpin will not be transferred to the light auxiliary cranks.

Although the compensating aspect of the invention has been described in connection with the wear or loss of a crankpin liner, the parts function similarly in the event a crankshaft bearing or crankshaft liner becomes worn or lost.

In the aforegoing forms the frame is shown interposed between the receiver and the cranks; in the following forms the frame is disposed between the cranks and the crankcase. While in the former application of the invention the frame under normal and abnormal conditions moves with the crankpin in a large orbit; in the following application of the invention, the frame member is substantially static under normal running conditions and is adapted to move in a relatively small orbit during abnormal running conditions. The inherent disturbing factors previously mentioned are provided for in a like manner in these forms employing a substantially static frame.

Referring to Figures 6 and 7, the form here shown is of the same nature of that of Figure 3. The crankcase 70 has a portion 71 providing slots 72 for the reception of projections 73 of an annular ring member 74. This ring member 74 is arranged to provide oppositely disposed projections 75 arranged substantially at right angles to the projections 73. These projections 75 are engaged by slots 76 in a frame 77 which provides journals 78 for auxiliary cranks 79. Cantilever pins 80 are pivotally connected to a knuckle pin receiver member 81 on the crankpin 82 of a main crankshaft 83. A bearing liner 84 is interposed between the crankpin and the knuckle pin receiver.

With this construction and arrangement of parts, the frame member 77 is substantially stationary under normal working conditions. During abnormal working conditions, i. e. in the event of wear or loss of the liner 84, the knuckle pin receiver is free to move radially outward into contact with the crankpin and thus moves in a larger annular orbit. The compensating connection between the members 71, 74 and 77 permits the frame to move radially outward in accordance with the displacement of the knuckle pin receiver and is thereby caused to move in an annular orbit of radius equal to the liner thickness.

In Figure 8 the auxiliary cranks are of resilient construction, that is springs 90 and 91 are disposed between the crankframe pins 92 and the knuckle pin receiver pins 93. These springs, arranged as shown, are adapted to transmit in tension or compression, forces acting between the said pins 92 and 93. With such construction the load applied to the cranks is distributed among substantially all the auxiliary cranks. The crankcase is not subject to shock loads as the shocks are absorbed by these springs.

The application of the invention has been illustrated in an engine or pump of substantially minimum outside diameter and with a relatively large number of cylinders closely spaced around the crankcase; little space thus remains not traversed by the connecting rods. The annular moving pins of the auxiliary cranks must therefore be of the cantilever type. The invention is also adaptable however in engines or pumps having fewer cylinders or having large outside diameter where ample space is provided between the connecting rods for the employment of straddle mounted auxiliary cranks and thus providing journals in both crankcase walls; the arms of such auxiliary cranks may thus be also of very light construction when used in a torque transmitting train employing compensating means. The links are required to sustain at all times substantially only the forces created by the torque of the knuckle pin receiver which are transmitted to the crankcase and are not subject to higher loads than for which they are designed.

Having thus described the principle of the invention as applied to several preferred forms, it is to be understood that other forms may be had without departing from the principle of the invention as defined by the appended claims; what is claimed is:

1. In a mechanism of the character described for converting reciprocating motion into rotary motion or vice versa, the combination of a crankcase, a crankshaft in the crankcase, a crankpin on the crankshaft, a knuckle pin receiving member on the crankpin, said knuckle pin receiver being subject to torque around the crankpin center, every point on the said member adapted to move in an annular orbit of the same magnitude as the orbit of the crankpin center under normal conditions, and self-adjusting means transmitting the said torque of the member to the crankcase, said means including auxiliary cranks, and a frame pivotally connected to the auxiliary cranks whereby every point on the knuckle pin receiver during abnormal condition is free to move in an annular orbit larger than the orbit of the crankpin center.

2. In a mechanism of the character described for converting reciprocating motion into rotary motion or vice versa, the combination of a crankcase, a crankshaft in the crankcase, a crankpin on the crankshaft having its center adapted to move in a substantially unvarying annular orbit, a knuckle pin receiving member on the crankpin, said member subject to torque around the crankpin center, every point on said member adapted to move in an annular orbit of substantially the same magnitude as the orbit of the crankpin center under normal running condition and adapted to move in an orbit larger than the said crankpin orbit during abnormal running conditions, self-adjusting means transmitting the said torque of the member to the crankcase, said means including auxiliary cranks, and a frame movable in an annular orbit and pivotally connected to the auxiliary cranks, whereby every point on the knuckle pin receiving member during abnormal conditions moves in an annular orbit greater than the crankpin orbit and greater than said orbit of every point on the frame.

3. In a mechanism of the character described for converting reciprocating motion into rotary motion or vice versa, the combination of a crankcase, a crankshaft in the crankcase, a crankpin on the crankshaft having its center adapted to move in a substantially unvarying annular orbit, a knuckle pin receiving member on the crankpin, said member subject to torque around the crankpin center and movable substantially in an orbit of the same magnitude as the crankpin center under normal running conditions and movable in a larger orbit during abnormal running conditions, and self-adjusting means transmitting said torque to the crankcase, said means including auxilitry cranks, and a frame pivotally connected to the auxilitry cranks and movable in an annular orbit, whereby said orbit inscribed by said knuckle pin receiving member is greater than said crankpin center orbit and greater than said orbit inscribed by the frame during abnormal running conditions.

4. In a mechanism of the character described, a crankcase, a crankshaft having a crankpin, its center adapted to travel in a circular path, a knuckle pin receiver member on the crankpin, auxiliary cranks of similar throws as the crankpin and journalled in the crankcase, an auxiliary crank frame pivotally connected to the auxiliary cranks whereby its center is confined to travel in a similar path as the travel path of the crankpin center, and a self-aligning torque transmitting connection between the auxiliary crank frame member and the knuckle pin receiver member, whereby misalignment between the knuckle pin receiver member and the auxiliary crank frame is accommodated.

5. In a mechanism for converting reciprocating motion into rotary motion or vice versa having a crankcase, a crankshaft in the crankcase, a crankpin on the crankshaft, a knuckle pin receiver member journalled on the crankpin and subject to torque around the crankpin center, means whereby said torque of the knuckle pin member is reacted in the crankcase, said means including an auxiliary crank frame pivotally connected to auxiliary cranks journalled in the crankcase, a torque transmitting connection between knuckle pin receiver member and the auxiliary crank frame, said torque transmitting connection being of the compensating type whereby misalignment and eccentricity between the knuckle pin receiver member and the auxiliary crank frame is accommodated.

6. In a mechanism for converting reciprocating motion into rotary motion or vice versa having a crankcase, a crankshaft in the crankcase, a crankpin on the crankshaft, a knuckle pin receiver member on the crankpin subject to torque around the crankpin center, auxiliary cranks pivotally connected to the crankcase, an auxiliary crank frame member pivotally connected to the auxiliary cranks, and a torque transmitting connection between the auxiliary crank frame and the receiver comprising a link joining the two whereby driving connection is established between the auxiliary crank frame member and the knuckle pin receiver member, and whereby misalignment and eccentricity between the knuckle pin receiving member and the auxiliary crank frame member is accommodated.

7. In a mechanism for converting reciprocating motion into rotary motion or vice versa having a crankcase, a crankshaft in the crankcase, a crankpin on the crankshaft, a knuckle pin receiver member on the crankpin having a circular working orbit and subject to torque around the crankpin center, auxiliary cranks pivotally connected to the crankcase, a frame member pivotally connected to the auxiliary cranks whereby it is confined in a working orbit concentric to the working orbit of the knuckle pin receiver member, and a torque transmitting coupling member between the frame member and the knuckle pin receiver member whereby eccentricity and misalignment between the working orbits of the frame member and the knuckle pin receiver member is accommodated.

8. In a mechanism for converting reciprocating motion into rotary motion or vice versa having a crankcase, a crankshaft in the crankcase, a crankpin on the crankshaft, a knuckle pin receiver member on the crankpin subject to torque around the crankpin center, auxiliary cranks pivotally connected to the crankcase, an auxiliary crank frame pivotally connected to the auxiliary cranks whereby the frame is maintained concentric to the knuckle pin receiver member, and a floating torque transmitting member between the auxiliary crank frame and the knuckle pin receiver whereby eccentricity and misalignment between the auxiliary crank frame and knuckle pin receiver is accommodated.

9. In a mechanism for converting reciprocating motion into rotary motion or vice versa having a crankcase, a crankshaft in the crankcase, a crankpin on the crankshaft, a knuckle pin receiver on the crankpin subject to torque around the crankpin center and adapted to transmit torque to the crankshaft, said receiver being movable in an annular orbit of the same magnitude as the orbit of the crankpin center during normal working condition and movable in a larger orbit during abnormal condition, auxiliary cranks having pivotal connection with the knuckle pin receiver, and means having connection with the crankcase and providing journals for the auxiliary cranks, whereby only the torque of the knuckle pin receiver around the crankpin center is transmitted by said auxiliary cranks to the crankcase during normal and abnormal working condition.

10. In a mechanism for converting reciprocating motion into rotary motion or vice versa, the combination including a crankcase, a crankshaft in the crankcase, a crankpin on the crankshaft, a plurality of auxiliary cranks, means journalled on said crankpin and subject to torque, means on the crankcase for receiving said torque, and a member operably associated with one of said means and pivotally connected to like ends of all of said cranks for transmitting said torque, whereby the torque of said means journalled on the crankpin is transmitted to the crankcase.

11. In a mechanism for converting reciprocating motion into rotary motion or vice versa, the combination including a crankcase, a crankshaft in the crankcase, a crankpin on the crankshaft, a plurality of auxiliary cranks, means journalled on said crankpin and subject to torque, means on the crankcase for receiving said torque, and a member having an adjustable torque transmitting connection with one of said means and pivotally connected to like ends of all of said cranks for transmitting said torque, whereby the torque of said means journalled on the crankpin is transmitted to the crankcase.

12. In a mechanism of the character described for converting reciprocating motion into rotary motion or vice versa, the combination of a crankcase, a crankshaft in the crankcase, a crankpin on the crankshaft, a knuckle pin receiver carried by said crankpin and subject to torque around the crankpin center and adapted to move in an annular orbit of the same magnitude as the orbit of the crankpin center under normal condition and movable in an annular orbit larger than the orbit of the crankpin center under abnormal conditions, and means in operable engagement with said receiver and said crankcase for transmitting said torque of the knuckle pin receiver to the crankcase, said means including a plurality of auxiliary cranks each being of a length equal to the throw of the crankpin and a frame pivotally connected to like ends of all of said cranks.

13. In a mechanism for converting reciprocating motion to rotary motion or vice versa, the combination including a crankcase, a crankshaft in the crankcase, a crankpin on the crankshaft, a knuckle pin receiver on the crankpin and subject to torque, torque receiving means on the crankcase for receiving forces created by said torque, and torque transmitting means between said knuckle pin receiver and said torque receiving means for transmitting said forces created by said torque to the crankcase, said torque transmitting means including a plurality of auxiliary cranks and a member having pivotal connections with like ends of said auxiliary cranks, and including operative connection with said knuckle pin receiver and said torque receiving means on the crankcase.

14. In a mechanism for converting reciprocating motion into rotary motion or vice versa, the combination including a crankcase, a crankshaft in the crankcase, a crankpin on the crankshaft, a plurality of auxiliary cranks, means journalled on said crankpin and subject to torque, means on the crankcase for receiving said torque, and a member operably associated with one of said means and pivotally connected to like ends of all of said cranks, the other ends of said cranks being pivotally connected to the other of said means, whereby the torque of said means journalled on the crankpin is transmitted to the crankcase.

15. In an engine or pump mechanism for converting reciprocating motion or rotary motion or vice versa, the combination including a crankcase, a rotatable shaft in the crankcase, a crankpin on said shaft, a knuckle-pin receiver on said crankpin and adapted to operate in a circular path around said shaft of magnitude prescribed by said crankpin, said receiver being subject to torque around said crankpin, means for transmitting forces created by said torque to the crankcase including a plurality of auxiliary links journalled in the crankcase and a frame pivotally engaged to like ends of said cranks, whereby said frame is adapted to operate in a circular path around said shaft of magnitude prescribed by said auxiliary cranks, and a floating connection between said knuckle-pin receiver and said frame whereby the magnitude of the path of the knuckle-pin receiver is variable with respect to that of the frame.

16. In an engine or pump mechanism for converting reciprocating motion or rotary motion or vice versa, the combination including a crankcase, a rotatable shaft in the crankcase, a crankpin on said shaft, a knuckle-pin receiver on said crankpin and adapted to operate in a circular path around said shaft of magnitude prescribed by said crankpin, said receiver being subject to torque around said crankpin, means for transmitting forces created by said torque to the crankcase including a plurality of auxiliary links journalled in the receiver and a frame pivotally engaged to like ends of said cranks, whereby said cranks are adapted to operate in a circular path around pivots in said frame of magnitude prescribed by their lengths, said frame having a floating connection with said crankcase whereby said frame is adapted to compensate any variation in the operating magnitude of the receiver.

BENJAMIN KAHN.